US008581724B2

(12) United States Patent
Wingate et al.

(10) Patent No.: US 8,581,724 B2
(45) Date of Patent: Nov. 12, 2013

(54) DYNAMIC INFORMATION PROJECTION FOR A WALL SENSOR

(75) Inventors: Barry Wingate, San Jose, CA (US); John R. Stauss, Los Gatos, CA (US); Norman La Var Krantz, Logan, UT (US); Anthony J. Rossetti, San Jose, CA (US)

(73) Assignee: Zircon Corporation, Campbell, CA (US)

( * ) Notice: Subject to any disclaimer, the term of this patent is extended or adjusted under 35 U.S.C. 154(b) by 1034 days.

(21) Appl. No.: 12/580,894

(22) Filed: Oct. 16, 2009

(65) Prior Publication Data

US 2010/0097212 A1    Apr. 22, 2010

Related U.S. Application Data

(60) Provisional application No. 61/105,856, filed on Oct. 16, 2008.

(51) Int. Cl.
*G08B 21/00*    (2006.01)

(52) U.S. Cl.
USPC ........... 340/540; 340/539.1; 324/67; 324/156

(58) Field of Classification Search
USPC ......... 340/540, 539.1; 324/67, 133, 156, 658, 324/662, 679, 529, 556; 362/184, 205, 208, 362/253
See application file for complete search history.

(56) References Cited

U.S. PATENT DOCUMENTS

| | | | |
|---|---|---|---|
| 4,099,118 A | 7/1978 | Franklin | |
| 4,464,622 A | 8/1984 | Franklin | |
| 5,143,442 A * | 9/1992 | Ishikawa et al. | 362/253 |
| 5,512,834 A * | 4/1996 | McEwan | 324/642 |
| 5,917,314 A | 6/1999 | Heger | |
| 6,249,113 B1 | 6/2001 | Krantz | |
| 6,259,241 B1 | 7/2001 | Krantz | |
| 6,266,048 B1 | 7/2001 | Carau | |
| 7,116,091 B2 * | 10/2006 | Miller | 324/67 |
| 7,215,327 B2 | 5/2007 | Liu | |
| 7,495,455 B2 * | 2/2009 | Sanoner et al. | 324/662 |
| 7,504,817 B2 * | 3/2009 | Sanoner et al. | 324/67 |
| 2004/0125147 A1 | 7/2004 | Liu | |
| 2007/0210785 A1 | 9/2007 | Sanoner | |
| 2007/0273848 A1 | 11/2007 | Fan | |

OTHER PUBLICATIONS

PCT Notification of Transmittal of the International Search Report and the Written Opinion of The International Searching Authority for PCT/US09/61061, date of mailing Dec. 10, 2009 (8 pages).

(Continued)

*Primary Examiner* — Hung T. Nguyen
(74) *Attorney, Agent, or Firm* — Silicon Valley Patent Group LLP

(57) ABSTRACT

An implementation of a system, device and method for projecting a visual indicator against a surface is provided. A display projection system in a handheld sensor device (e.g. a handheld wall scanner) projects a static or computer-controlled dynamic pattern of light onto a surface being scanned to indicate a specific feature, such as existence of solid structures of wood, metal or plastic, electric or magnetic fields, or a disturbance of a field. The projected light may be controlled by a computer via an aperture to allow flexibility in what is projected, such as icons, lines, graphics, characters and colors.

32 Claims, 17 Drawing Sheets

(56) References Cited

OTHER PUBLICATIONS

Ramesh Raskar, "Portable Projectors", Technology Review, Dec. 2004, Published by MIT (3 pages).

Jin-Seo Sho, "Phone to Carry Video Projector", The Korea Times, Apr. 13, 2006, (1 page).

"Handheld projector", Wikipedia, http://en.wikipedia.org/wiki/Handheld_projector, downloaded Oct. 14, 2009 (3 pages).

Paul Beardsley, "Handheld Projectors for Mixing Physical and Digital Textures", IEEE Computer Society Conference on Computer Vision and Pattern Recognition (CVPR), ISSN: 1063-6919, vol. 3, p. 112, Jun. 25, 2005 (1 page).

"Virtual Keyboard-Laser projected full-sized virtual keyboard-Technology: How does it work?", I-Tech, http://www.virtual-laser-keyboard.com/demo.asp, downloaded Oct. 14, 2009 (2 pages).

\* cited by examiner

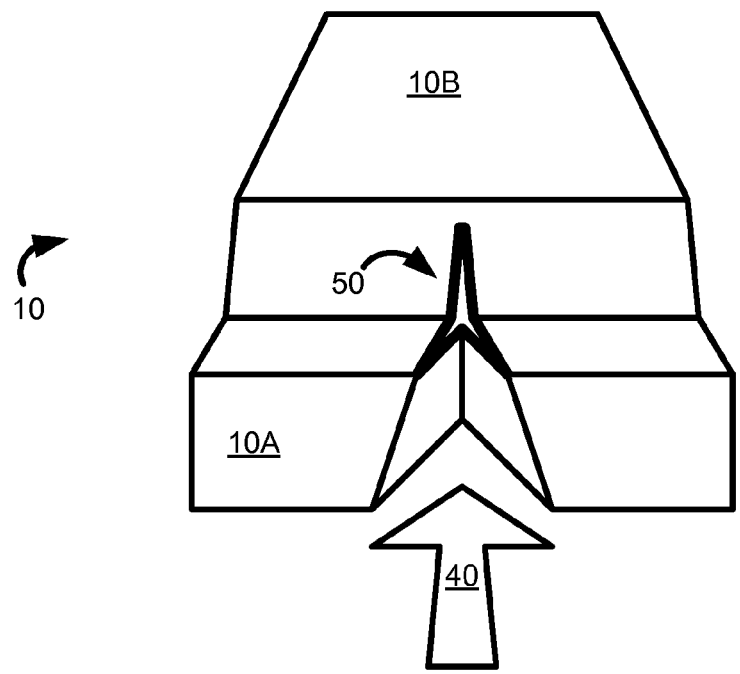
FIG. 3A
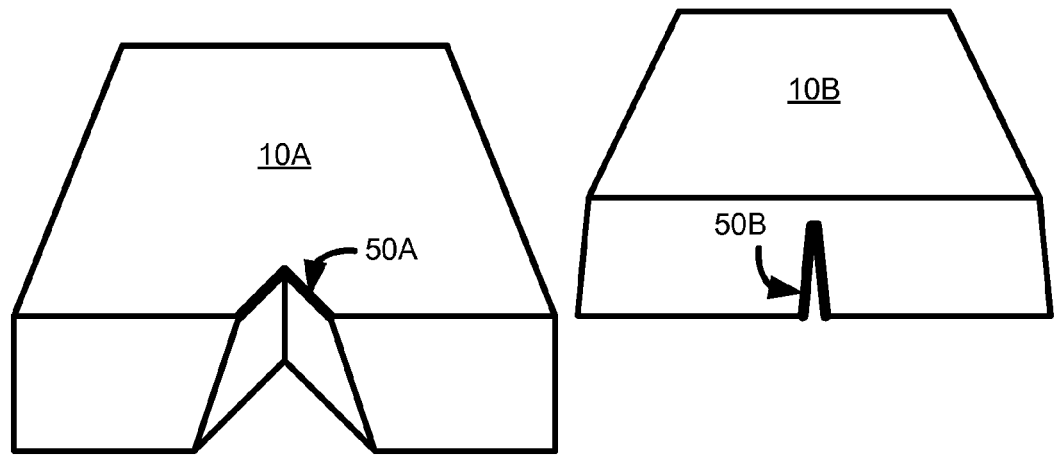
FIG. 3B
FIG. 3C

DYNAMIC INFORMATION PROJECTION FOR A WALL SENSOR

CROSS-REFERENCE TO RELATED APPLICATIONS

This application claims the benefit under 35 U.S.C. 119(e) of U.S. Provisional Application Ser. No. 61/105,856 by Anthony J. Rossetti as the first named inventor, entitled "Dynamic information projection for a wall scanner", and filed Oct. 16, 2008, which is incorporated herein by reference in its entirety.

BACKGROUND OF THE INVENTION

1. Field of the Invention

The invention relates generally to handheld sensor devices, such as stud sensors, and more specifically to projection of visual indicators against a surface regarding a hidden object.

2. Background of the Invention

Portable sensors, including handheld detector units, are used to locate hidden objects are known. For example, U.S. Pat. Nos. 4,099,118, 4,464,622, and 6,259,241, which are incorporated herein by reference, disclose detector units (e.g., "stud sensors" and alternating current detectors) that identify a hidden object's position behind a surface. Some handheld detectors identify the hidden object by measuring a capacitance change in one or more sensor elements within the detector unit as the user moves the unit across the wall over the hidden object. Such hidden objects include wooden structural studs, pipes, and other metal and nonmetal objects such as wiring. Some handheld detectors contain sensor element and detecting circuitry to measure electromagnetic field changes to identify wires carrying alternating current. Some detectors identify objects that affect a local magnetic field, such as masses of metal or gas lines.

FIG. 1 illustrates a typical application in which a user holds a handheld sensor device 10 against wall or other surface 12. The user moves device 10 transversely, as indicated by the arrows, to detect an object hidden from view behind the surface 12. The object may be hidden framing or a stud 14 defining a first edge 18, a centerline 20 and a second edge 22. Circuits within device 10 display the sensed information on display 16.

A handheld detector unit typically indicates a sensed feature (e.g., an edge 18 or a centerline 20) using a visual display, such as display 16. A device's visual display may include one or more light-emitting diodes (LEDs) and/or liquid crystal display (LCD) in various configurations. For example, some devices include an arrow-shaped LED display. Another device sold under the name Intellisensor® made by Stanley in New Britain, Conn., uses a vertical line of LEDs for a display. In addition, U.S. Pat. No. 6,249,113, issued Jun. 19, 2001, and U.S. Pat. No. 5,917,314, issued Jun. 29, 1999, both incorporated herein by reference, disclose several LCD and LED display configurations. Typically, a visual display 16 of a handheld sensor device is designed to assist the device user in determining some characteristic of a sensed object, such as an edge or a centerline. Referring again to FIG. 1, for example, display 16 may indicate stud 14's edge 18, a centerline 20 located between edge 18 and edge 22, both edges 18 and 22, or other representations of stud 14.

The display or displays 16 are typically mounted in the housing of the handheld sensor device. Thus, the display 16 is distance from the surface 12. That is, the display 16 is displaced both laterally and in depth from the surface 12 behind which the detected object is located. Furthermore, users often operate handheld detectors at skewed angles and in unusual positions such as when searching for objects that are behind ceilings, floors, corners, etc. For example, in FIG. 1, if stud 14 is located behind a surface 12 that is close to a large visual obstruction, such as a water heater tank, the user will have difficulty seeing display 16. Even if display 16 is visible, the skewed viewing angle requires the user to make a visual angular estimate of the hidden object's location behind the surface, based on the display's position in the detector unit housing.

Known in an unrelated art is projecting information from a computer against a surface. For example, U.S. Pat. No. 6,266,048, by Carau, Sr., issued on Jul. 24, 2001 and titled "Method and apparatus for a virtual display/keyboard for a PDA", discloses a computer or PDA with a projected display onto a substantially flat, white surface to create a virtual computer screen display and a projected keyboard onto the substantially flat, white surface. Similarly in U.S. Pat. No. 7,215,327, by Liu et al. issued May 8, 2007 and titled "Device and method for generating a virtual keyboard/display", a keyboard and display are projected. Such projection technologies may be advantageously used in handheld sensor devices.

Handheld sensor devices, such as stud sensors, wall scanners, AC voltage detectors and magnetic field disturbance sensors, display information to a user using one or more LEDs and/or LCD displays located on the body of the device. Some devices use light passed through an aperture or slit on the body of the device to project a line or lines onto the wall surface. Such a slit does not produce a distinct two-dimensional icon but rather a length of light that has no discernible or distinctive features along a dimension. See, for example, U.S. Pat. No. 6,259,241, by Krantz issued on Jul. 10, 2001 and titled "Projected display for portable sensor indicating the location of a detected hidden object behind a surface", which discloses a handheld detector that projects a visible pattern onto the surface behind which a detected object is located. The projected pattern represents one or more predetermined characteristics of the detected object. A predetermined characteristic may include an edge, a position between two edges, a centerline between two edges, a characteristic of the object's mass, and/or an electromagnetic characteristic emitted or affected by the object. Also discloses is a narrow aperture defined in one end of the detector unit housing. When the detector unit's sensing circuit detects a hidden object, the sensing circuit signals an activating circuit that energizes a light source within the detector housing. A portion of the light from the light source passes through the aperture and thereby projects a line onto the surface beneath which the detected object is located. The line is projected in a single dimension. That is, there is no lateral distinctiveness to the projected line. Furthermore, the projected line may not have distinct side edges or the line may easily be misaligned due to the LED being butted against the aperture opening.

FIG. 1 illustrates a typical application in which a user holds a handheld sensor device against wall or other surface. The handheld sensor device is being used to scan the wall to determine the existence of hidden object beneath the surface. The handheld sensor device may project information various detected features. Such features may include whether the device is over an object (such as a stud), at an edge of the object, or at the center of the object, whether the object is metal, and whether the device is over electrically hot AC wires, etc. Additionally, the device may display a direction to the hidden object. Furthermore, different colors may be projected to help convey changing information to the user. Embodiments project this information using one or more static and/or dynamic apertures.

In general, a conventional handheld sensor device uses visual and audio feedback emanating from device to tell a user of the device that it has detected a stud or other hidden object. Typically, a handheld sensor device includes one or more LEDs and/or an LCD display to visually show the existence of a stud detected behind a wall or other surface. In some devices, a single line or a plurality of lines, and may be projected in one or more directions. Therefore, what is desired is a way to improve how information is presented to the user.

SUMMARY

Some embodiments of the present invention provide for a handheld sensor device to project a visual indicator against a surface, the device comprising: a sensor to sense an object behind the surface and to provide a data signal; a controller coupled the sensor to receive the data signal, the controller configured to activate a first icon based on the data signal and to provide a control signal, wherein the first icon comprises a distinct two-dimensional icon; and a light source coupled to controller to receive the control signal and to project the first icon against the surface, the light source comprising a light emitting source; and an aperture defined to project light from the light emitting source as the first icon.

Some embodiments of the present invention provide for a method to project a visual indicator against a surface using a handheld sensor device, the method comprising: sensing an object behind the surface; determining a first feature of the sensed object; and projecting, from a light emitting source and through an aperture shaped to project light as a first icon onto the surface, a first icon indicating the first feature, wherein the first icon comprises a distinct two-dimensional icon.

Some embodiments of the present invention provide for a handheld sensor device to project a visual indicator against a surface, the device comprising: means for sensing an object behind the surface; means for determining a first feature of the sensed object; and means for projecting, from a light emitting source and through an aperture shaped to project light as a first icon onto the surface, a first icon indicating the first feature.

Some embodiments of the present invention provide for a method for detecting an object behind a surface using a handheld sensor device, the method comprising: sensing a first feature of the object; selecting a first icon, from a plurality of icons, based on sensing the first feature, wherein the first icon comprises a distinct two-dimensional icon; projecting the first icon against the surface in response to being selected; sensing a second feature of the object; selecting a second icon, from the plurality of icons, based on sensing the second feature, wherein the second icon comprises a distinct two-dimensional icon; and projecting the second icon against the surface in response to selecting the second icon.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

FIGS. 3A, 3B and 3C show perspective views of a housing and a projected arrow, in accordance with embodiments of the present invention.

DETAILED DESCRIPTION OF THE INVENTION

Figure 1:
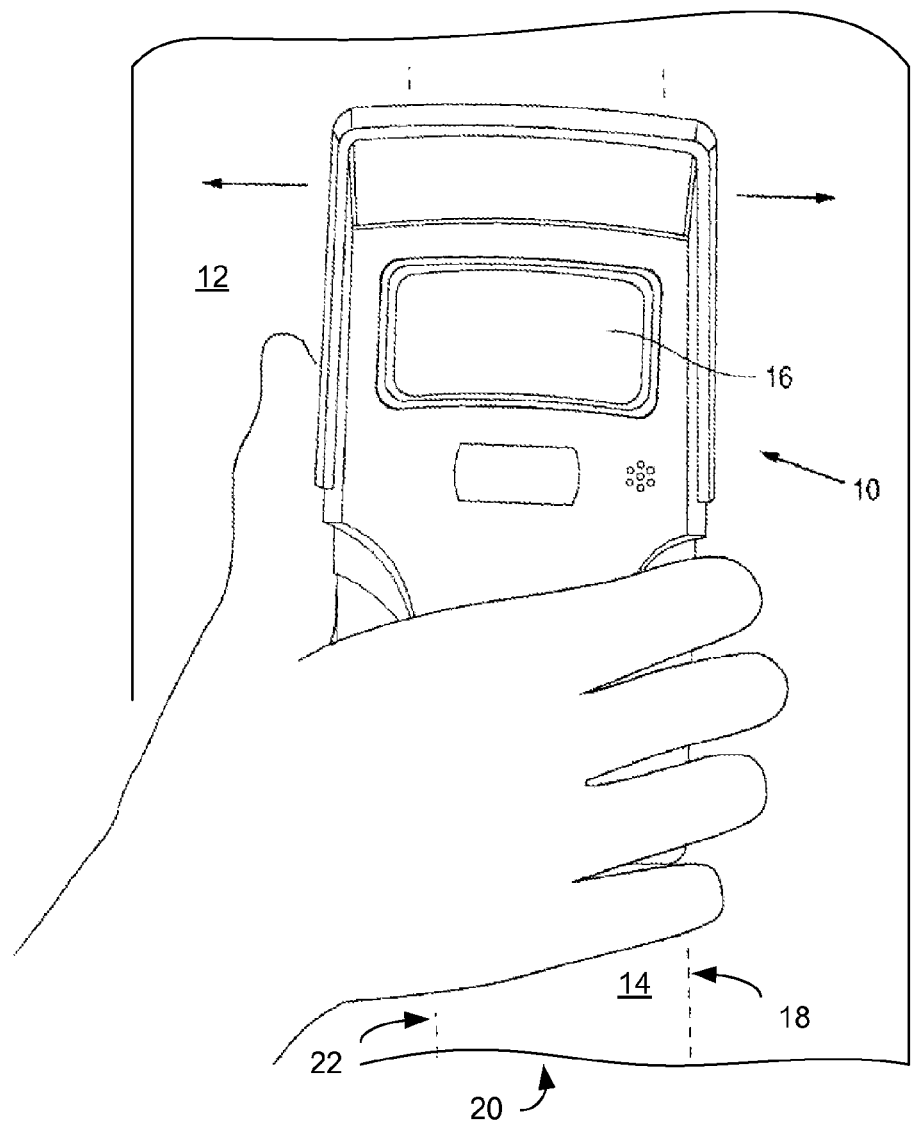
FIG. 1 illustrates a typical application in which a user holds a handheld sensor device against wall or other surface.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

Embodiments of the present invention provide an improved optical light projection system able to project information through static or dynamic light patterns, such as icons, pixels, graphics and/or colors, to convey information to the user. Some embodiments include appropriate illuminators, apertures, and potentially lenses and computer-controlled apertures to create a dynamic information display projected onto the surface being scanned.

Typical, handheld sensor devices provide information to the user using display(s) mounted on the body of the device, and not on the surface being scanned. Embodiments of the present invention instead display user-interface information directly onto the surface being scanned so as to more intimately convey detected information to the user. Because projected light does not introduce any physical interference, a device that allows a user to super-impose marks (with pencil, tape, etc.) at precise locations on the wall as guided by the projected display improves the accuracy of such marks. These marks remain behind even after the unit is removed to aid the user in remembering where the hidden objects are located.

Some embodiments of the present invention project graphical information and characters on the working area of a surface when using a handheld sensor devices (e.g. stud sensor), or other portable tool. The handheld sensor device includes light source(s), aperture(s), and optional lenses to project this graphical information against the surface.

In accordance with some embodiments of the present invention, a static aperture is used to project an arrow icon or other fixed two-dimensional icon against a surface when a feature is detected by the device. The displayed icon is formed by LED light passing from a distance through a fixed-shaped aperture. Because the light is passed to the aperture from a distance (and not butted against the aperture), the projection is less susceptible to having indistinct side edges and misalignment. In accordance with other embodiments of the present invention, more complicated information may be projected and displayed via a dynamic aperture that changes during scanning to indicate the one or more detected features. The more complicated information may include one or more icons or other graphic as well as text.

Figure 2A:
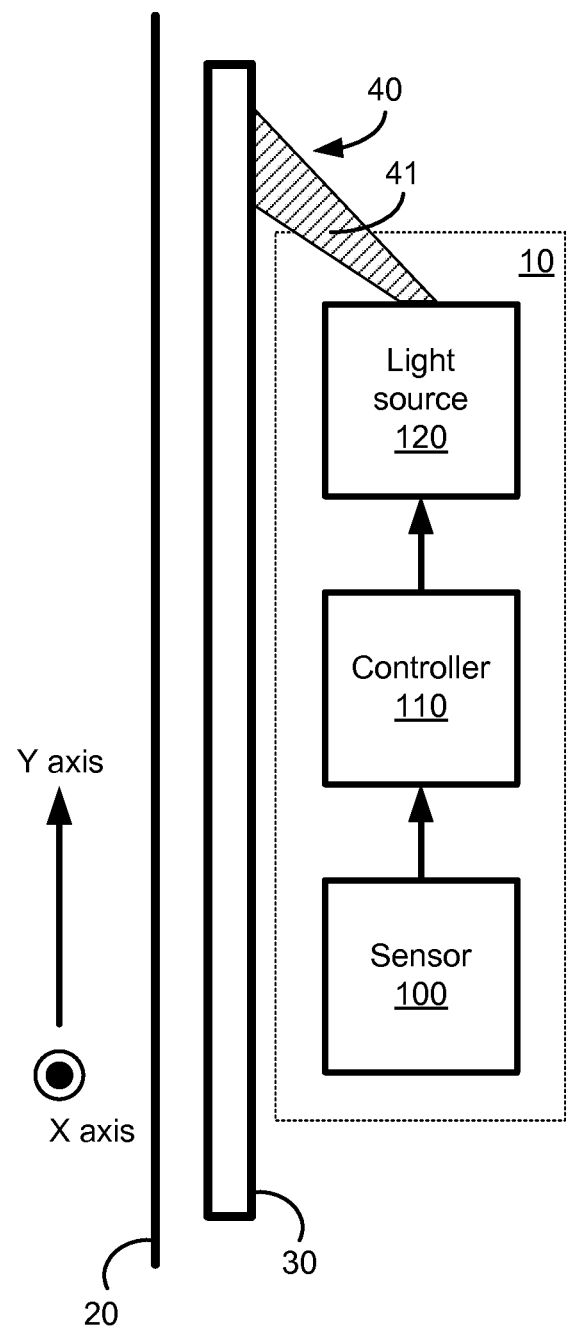
FIGS. 2A and 2B illustrate views of a handheld sensor in operation, in accordance with embodiments of the present invention.
Figure 2B:
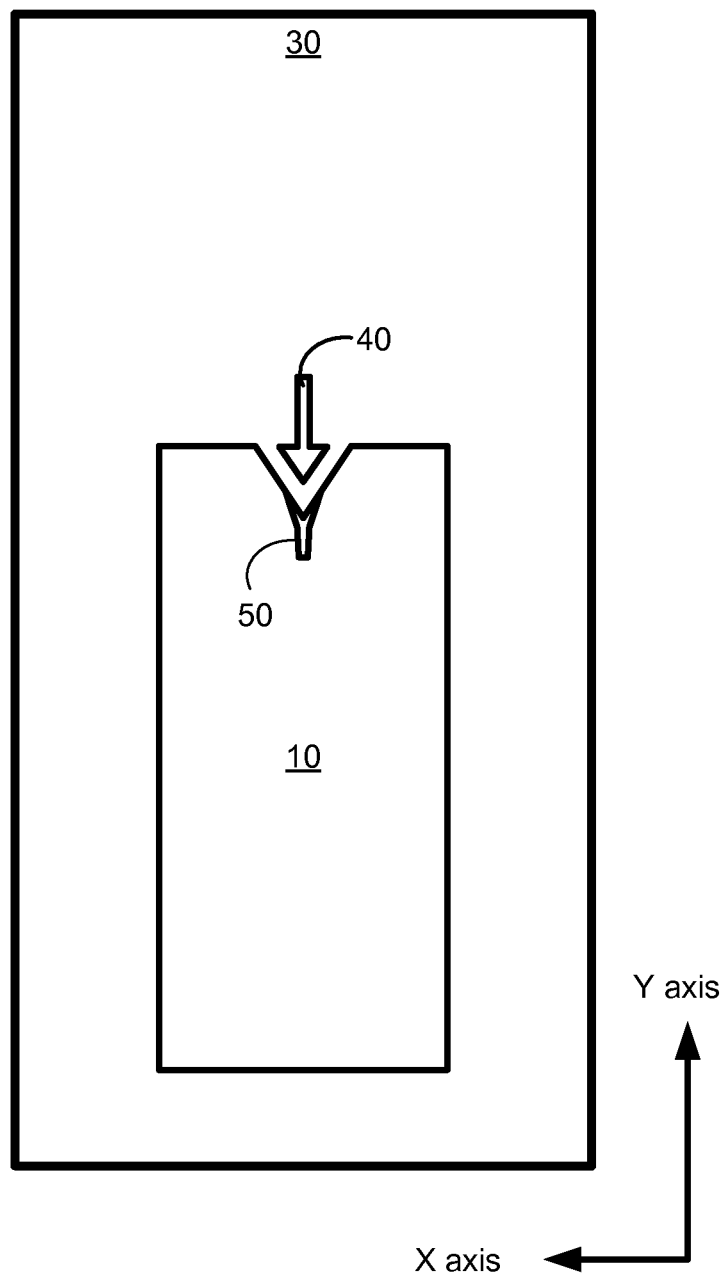

FIGS. 2A and 2B illustrate views of a handheld sensor device 10 in operation, in accordance with embodiments of the present invention. In FIG. 2A, the handheld sensor device 10 is shown projecting a light stream 41 against a surface 30 resulting in a fixed two-dimensional icon 40 to reveal a feature of a hidden object, such as an edge 18 of a stud 14. The device 10 includes a sensor 100, a controller 110, and a light source 120. The sensor 100 senses the hidden object behind surface 30 and provides a data signal to the controller 110. For example, the data signal may indicate the presence of an edge feature or a center feature of the hidden object. The sensor 100 may include one or more of a capacitive sensor, a stud sensor, an electrical field sensor, and a magnetic field sensor or the like.

Based on the data signal from the sensor 100, the controller 110 activates a light source 120 to project a light stream 41, which results a first icon 40 being displayed against the surface 30. The light source 120 includes a light emitting source 121 and an aperture 50 (shown in figures described below) when combined operate to shape the projected light from the light emitting source 121 through the aperture 50 as an arrow or other two-dimensional icon against the surface 30.

The light source 120 may be formed with one or more LEDs (examples below), a lamp, bulb, or the like. In some embodiments, the light source 120 may also project a second icon against the surface 30. For example, the first icon created from a first static aperture may represent a center feature and the second icon created from a second static aperture may represent an edge feature of the hidden object. In some embodiments, the light source 120 projects a single color icon, while in other embodiments, the light source 120 may project a selected one of two or more different colored icons to represent a corresponding two or more different features. For example, one color may be used to indicate an edge feature while another color is used to indicate a center feature. Alternatively, a first color may indicate a shallow stud while a second color indicates a deep stud. Yet as another alternative, a red colored icon may be used to indicate an electrically hot AC circuit, a blue icon may be used to represent a non-electrical metal object, such as a pipe, and a green icon may be used to represent a stud.

FIG. 2B shows a top-down view outlining a handheld sensor device 10 projecting fixed two-dimensional icon (arrow 40) onto a surface 30. The device 10 is configured with a static aperture 50 that allows light to pass from the device 10. The aperture 50 is formed such that passing light projects the arrow 40.

FIGS. 3A, 3B and 3C show perspective views of a housing and a projected arrow, in accordance with embodiments of the present invention. The housing of the handheld sensor device 10 includes a base housing 10A (FIG. 3B) and top housing 10B (FIG. 3C) and is shown combined into a single integrated housing (FIG. 3A). The base housing 10A includes a notch 50A, which appears as a wide-angled inverted 'V' positioned parallel to the surface 30. The plane of the wide-angled inverted 'V' may be exactly parallel (0 degress) or off-parallel (up to 30 degrees or more from parallel) to the surface 30. The top housing 10B also includes a notched 50B, but appears as a narrow-angled inverted 'V' positioned perpendicular to the surface 30. Again, the plane of the narrow-angled inverted 'V' may be exactly perpendicular (0 degrees) or off-perpendicular (up to 30 degrees or more from perpendicular) to the surface 30. When positioned on top of one another, the two notches 50A and 50B define a static aperture 50. Due to the inverted 'V' shapes from notches 50A and 50B positioned together, when the two housing sections 10A and 10B are combined the light passing from inside the device 10 through the defined aperture 50 results in an arrow 40 projected on the surface 30.

Figure 4:
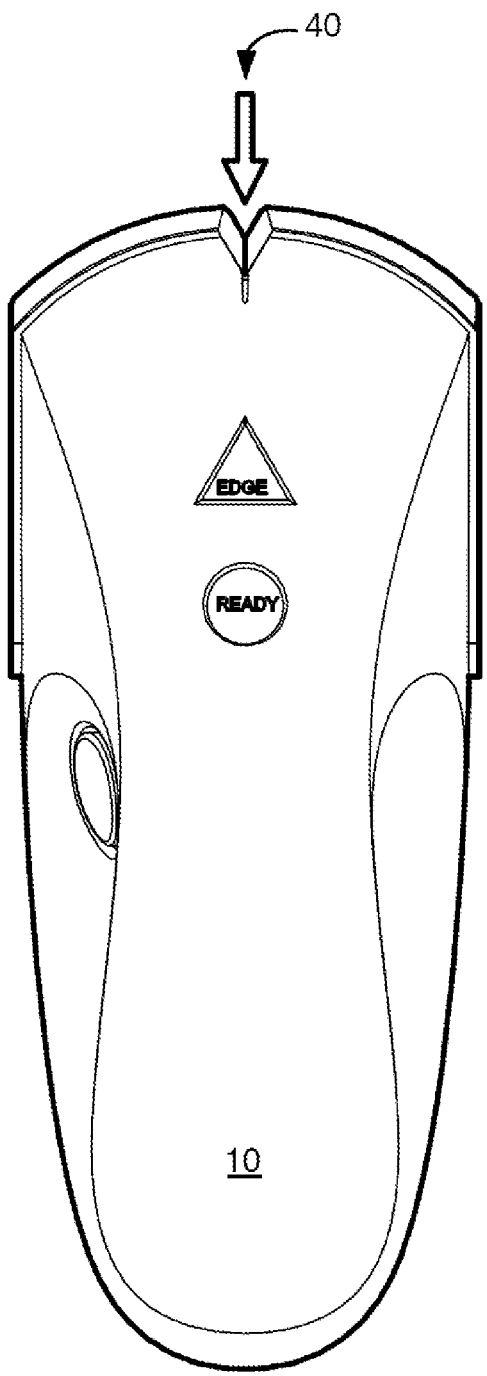
FIGS. 4, 5, 6, 7A and 7B shows a relationship between an LED, an aperture and a projected arrow, in accordance with embodiments of the present invention.

FIGS. 4, 5, 6, 7A and 7B shows a relationship between an LED, an aperture and a projected arrow, in accordance with embodiments of the present invention. In FIG. 4, the light source projects an arrow 40 in front of the device. The arrow 40 has a distinctive two-dimensional shape unlike a one-dimensional line of conventional devices. In conventional handheld sensor device, the LED butts up against the housing wall such that the greatest dimension of the aperture is greater than the distance between the LED and the housing wall. Embodiments of the present invention disclose a light emitting source (e.g., LED 121) distant from the aperture 50. Distancing the LED 121 from the aperture enables the handheld sensor device 10 to define a distinct and fixed two-dimensional icon (e.g., arrow 40) against the surface 30.

Figure 5:
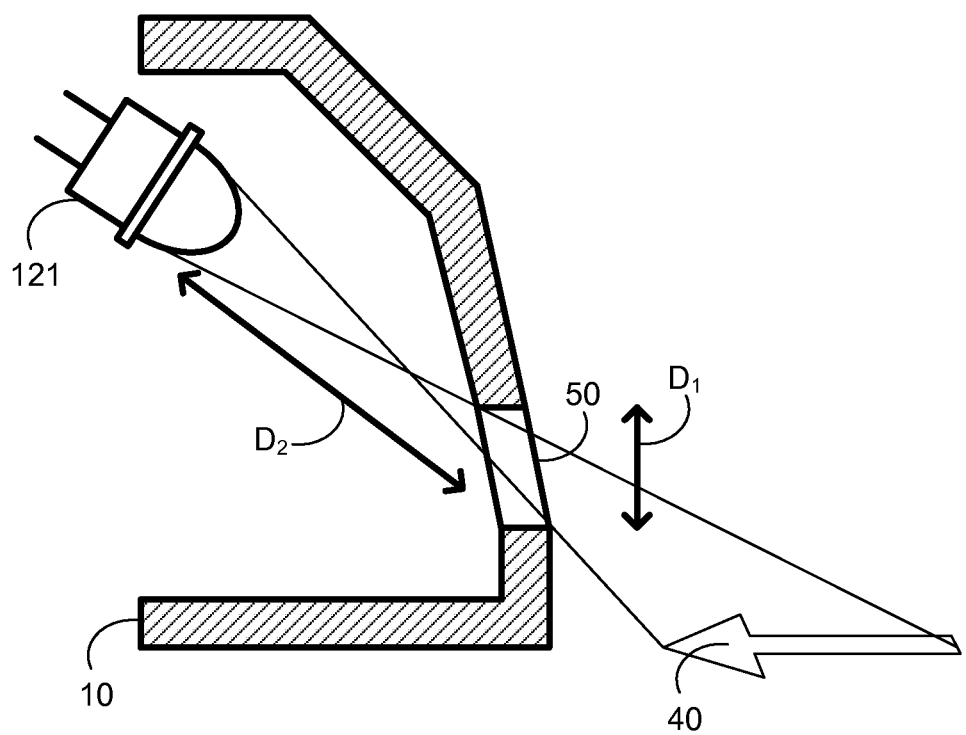
Figure 6:
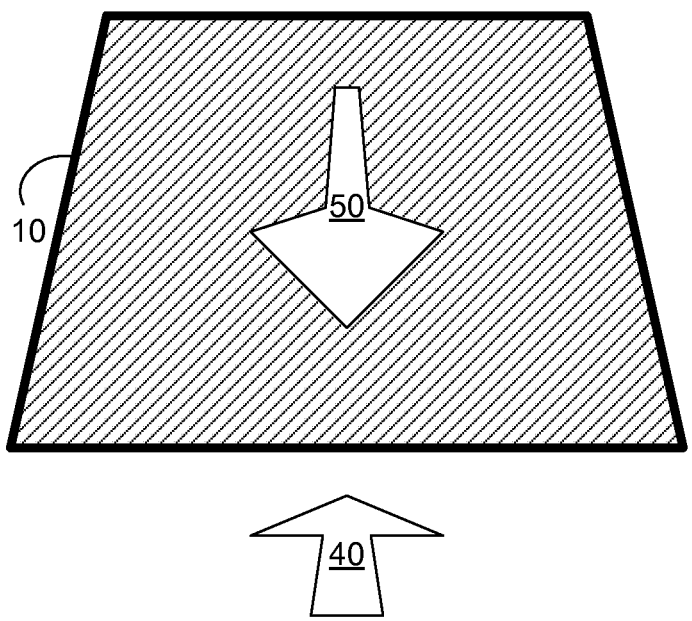

In FIG. 5, an LED 121 is used as the light emitting source. The LED 121 is positioned distant from the aperture 50. The greatest perpendicular dimension of the aperture 50 defines a distance $D_1$. For example, assume the height of the aperture 50 provides the largest lateral opening. The LED 121 is positioned internally within the device 10 at a distance $D_2$ from the aperture 50, where $D_2$ is greater than $D_1$ ($D_2 > D_1$). In some embodiments, the ratio of $D_2$ and $D_1$ are such that $D_2:D_1=2:1$. In other embodiments, the ratio $D_2:D_2$ is approximately 3:1, 4:1, 5:1, or greater than 5:1. For example, the greatest dimension of the aperture ($D_1$) may be 2 mm and the distance ($D_2$) between the aperture and the LED may be 9 mm, such that the ratio $D_2:D_1$ is be 4.5:1. FIG. 6 shows a view up into the aperture 50 from a perspective near the surface 30 and near the projected arrow 40. From this perspective, the aperture 50 appears more as an arrow.

Figure 7A:
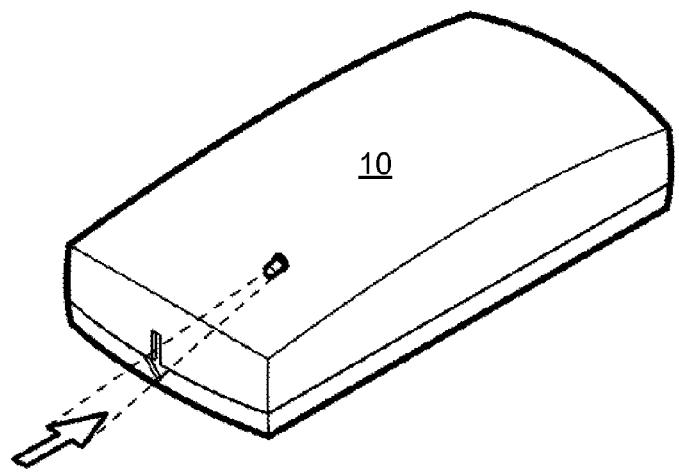
Figure 7B:
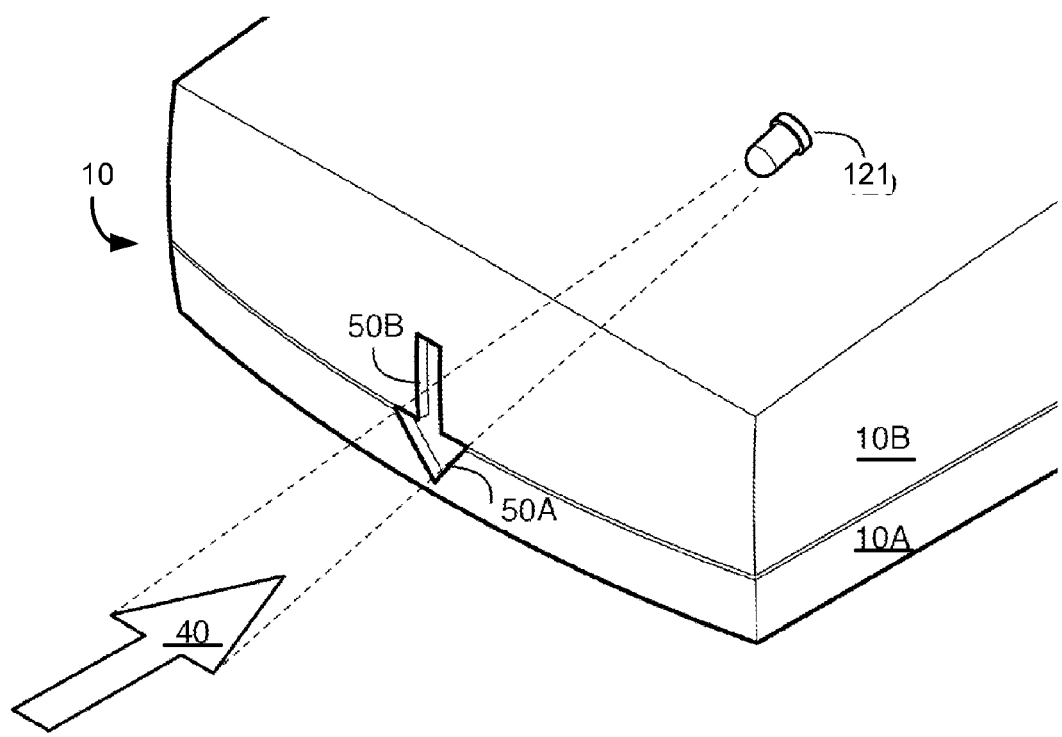

In FIGS. 7A and 7B, the handheld sensor device 10 is shown with a base housing 10A and a top housing 10B. The base housing 10A has a wide V-shaped notch 50A oriented perpendicularly or nearly perpendicular to the surface 30. The top housing 10B defines a trapezoid notch 50B with a narrow top edge parallel to both the surface and to an imaginary similar-length or wider bottom line and also defines two side edges parallel or nearly parallel to one another. The distance $D_2$ between the aperture 50 and the light emitting source 121 is approximately 2 to 5 (or 5 to 30 or more) times farther than the distance $D_1$ of the aperture. Here, the ratio $D_2:D_1$ is shown to be approximately 20:1. Channeling the light from the light emitting source 121 to the aperture 50 allows for this ratio to be larger and more efficient.

Figure 8:
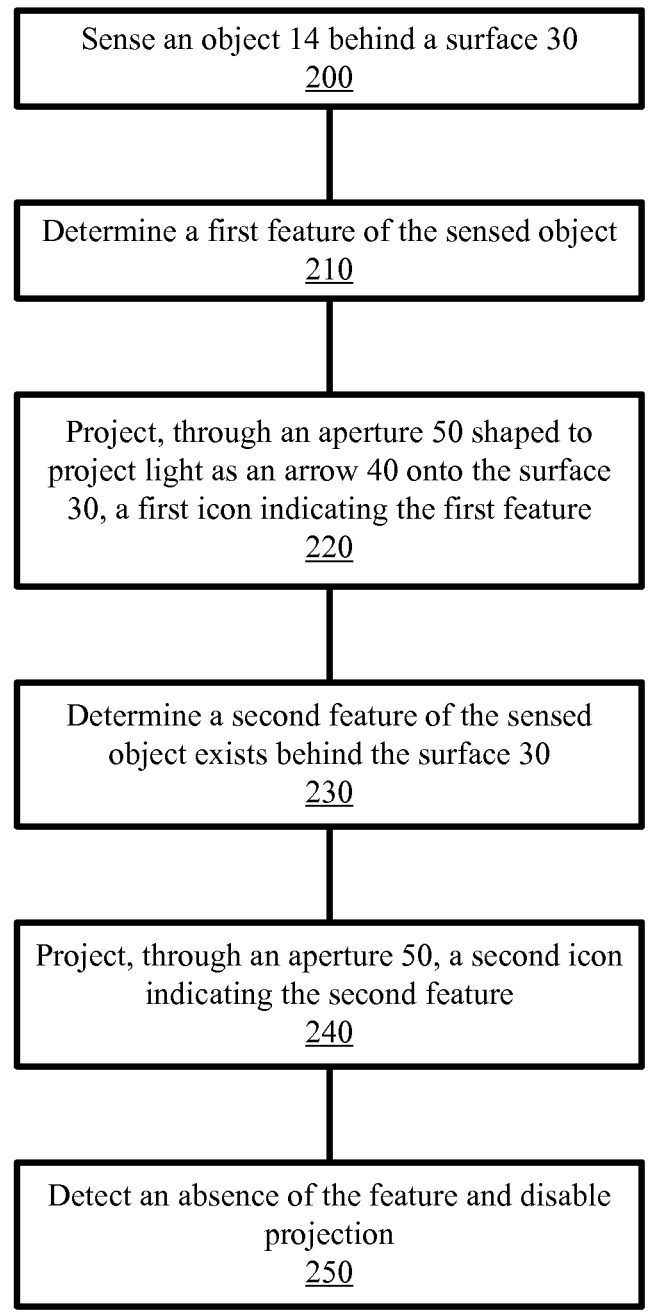
FIG. 8 shows method of projecting a visual indicator, in accordance with embodiments of the present invention.

FIG. 8 shows method of projecting a visual indicator, in accordance with embodiments of the present invention. The method, using a handheld sensor device 10, begins at block 200 by sensing a stud 14 behind a surface 30. At 210, the device 10 determines a first feature of the sensed stud 14. At 220, the device 10 projects, through an aperture 50 shaped to project light as an arrow 40 or other distinct two-dimensional icon onto the surface 30, a first icon indicating the first feature. At 230, the device 10 determines a second feature of the sensed object exists behind the surface 30. At 240, the device projects, through an aperture 50, a second icon indicating the second feature. The aperture of steps 220 and 240 may be different static apertures, the same static aperture, or a common dynamic aperture. For example, the stud 14 may be a stud and the first feature may be an edge 18 or 22 of the stud, and the second feature may be a centerline 20 of the stud 14. The first and second projected icons may be identical, have different colors and/or different shapes or orientations. At 250, the device detects absence of the feature and disable projection.

Figure 9A:
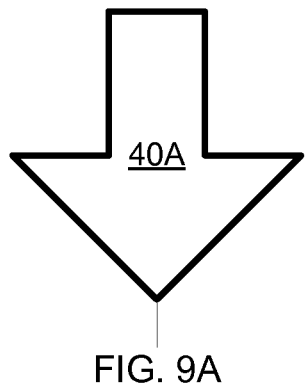
FIGS. 9A, 9B, 9C, 9D and 9E show various projected arrows, in accordance with embodiments of the present invention.
Figure 9B:
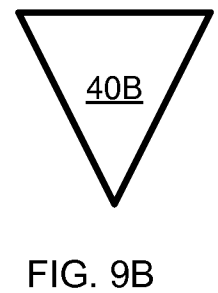
Figure 9C:
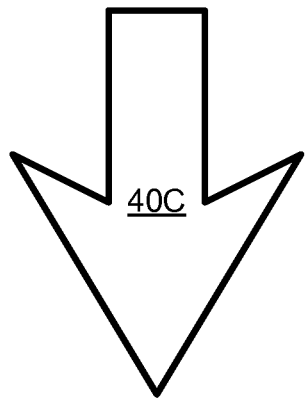
Figure 9D:
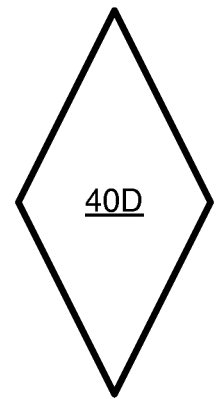
Figure 9E:
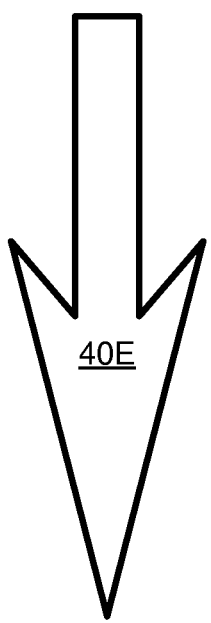

FIGS. 9A, 9B, 9C, 9D and 9E show various projected arrows, in accordance with embodiments of the present invention. Each arrow comprises a distinct two-dimensional icon, is formed by passing light at a distance $D_2$ from an aperture 50, and includes a distinctive head and may also include a tail or shaft. FIG. 9A shows a traditional arrowhead and shaft 40A with a straight-lined head backing. In FIG. 9B, the arrowhead 40B similar to the arrow 40A but is void of a shaft. In FIG. 9C, the arrowhead and shaft 40C includes an arrowhead with V-lined head backing. In FIG. 9D, the arrowhead 40D is double-headed. In FIG. 9E, the arrowhead and shaft 40E is elongated. Unlike a projected line, each arrow has characteristics in two dimensions and is used to distinctly point to a location on a surface 30.

Several of the embodiments described above included a passive aperture 50 in which light passes through a preformed and fixed aperture 50 to form a distinct two-dimensional icon, such as an arrow, on the surface 30. Similarly, a handheld sensor device 10 may include a plurality of passive apertures 50 each channeling light from a separate LED or other light source. Each aperture may be shaped and position to form a separate icon. For example, a first aperture 50 may be formed to present an arrow 40A. To project the arrow from the first aperture 50, a first LED may be illuminated. A second aperture 50 may be formed to present an arrow pointing to the left indicating an object is to the left of the device 10. To project the left-pointing arrow from the second aperture 50, a second LED may be illuminated channeling light just to the second aperture 50. A third aperture 50 may be formed to present an arrow pointing to the right to indicate an object is to the right of the device 10. Similarly, to project the right-pointing arrow from the third aperture 50, a third LED may be illuminated channeling light just to the third aperture 50. Separate channels may be formed with individual clear material, such as plastic tubes, or may be formed by physically dividing an open space with the device 10.

In other embodiments, the aperture 50 is dynamic. That is, light passing through the aperture is actively regulated such that a variety of icons or other information may be projected onto the surface 30. Light may be regulated through an LCD lens, through an active shutter, or the like. Examples of devices 10 using a dynamic aperture 50 are given below.

Figure 10A:
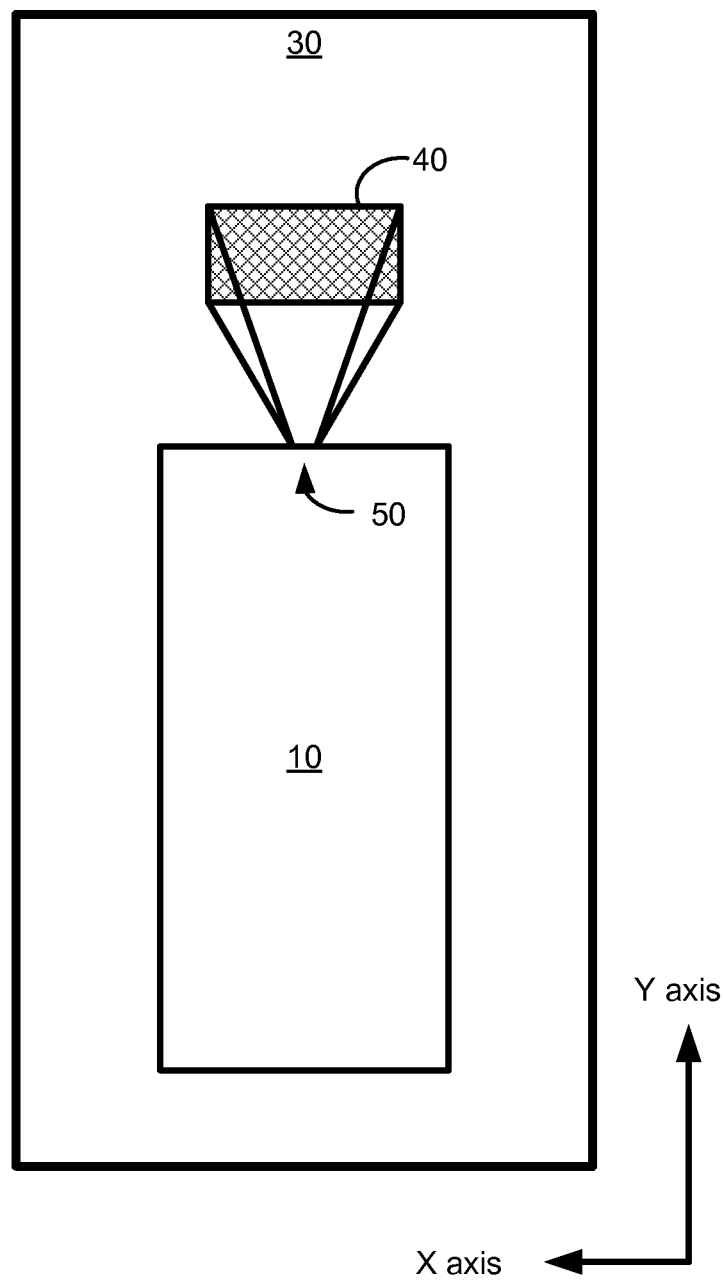
FIGS. 10A, 10B, 10C, 10D and 11 show top-down views of a handheld sensor device projecting display information, in accordance with embodiments of the present invention.

FIGS. 10A, 10B, 10C, 10D and 11 show top-down views of a handheld sensor device 10 projecting display information, in accordance with embodiments of the present invention. In FIG. 10A, a handheld sensor device 10 includes a dynamic aperture 50, which allows light to pass to form a display area 40 on the surface 30. The device 10 projects one or more distinct two-dimensional icon within this display area 40. Several of possible icons are described below by way of example.

Figure 10B:
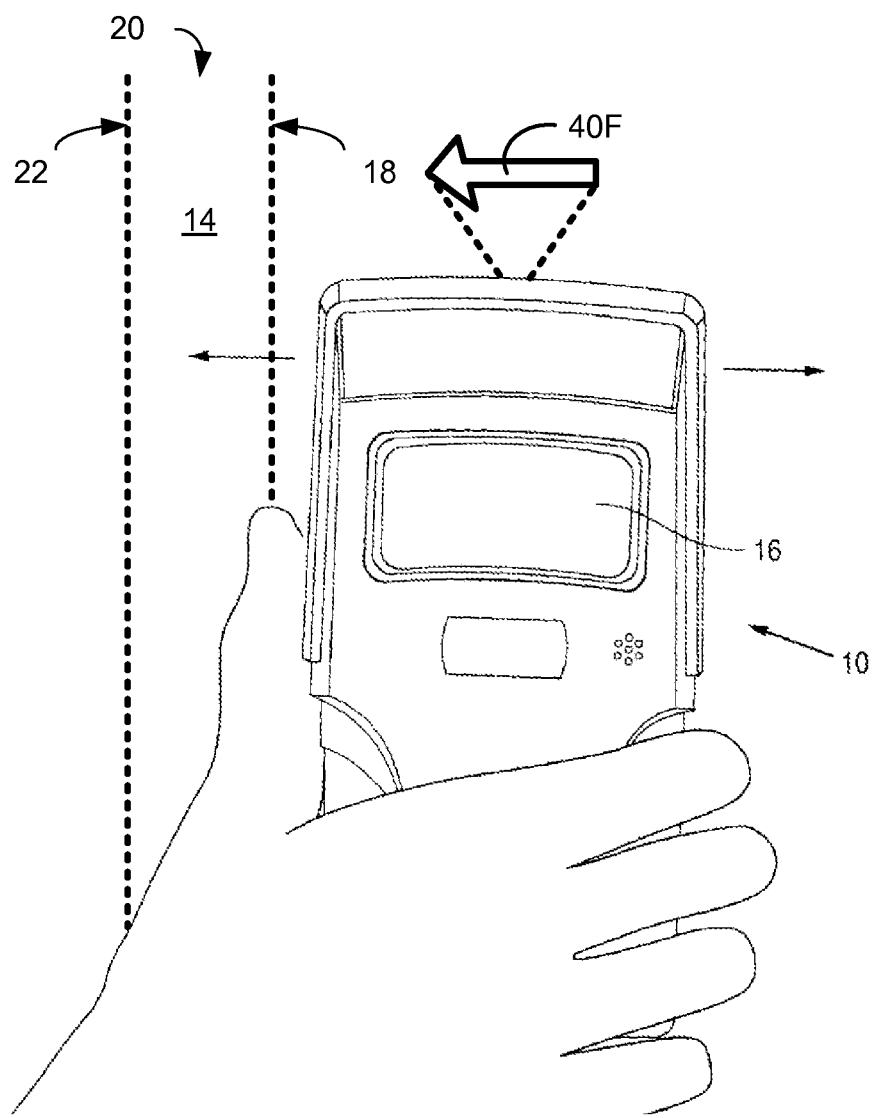

In FIG. 10B, a user operates a handheld sensor device 10 searching for a hidden stud 14. The device 10 detects an edge 18 to the left of the sensor but it not yet over the edge 18. Conventional devices provide an indication showing a hidden stud is close but does not indicate which direction the user should move the device. Using a device 10 with directivity sensing, the device 10 may determine a direction of the hidden object. The handheld sensor device 10 projects an arrow 40F indicating to the user that the hidden object is to the left. Simultaneously, the device 10 may provide similar information on a display 16.

Figure 10C:
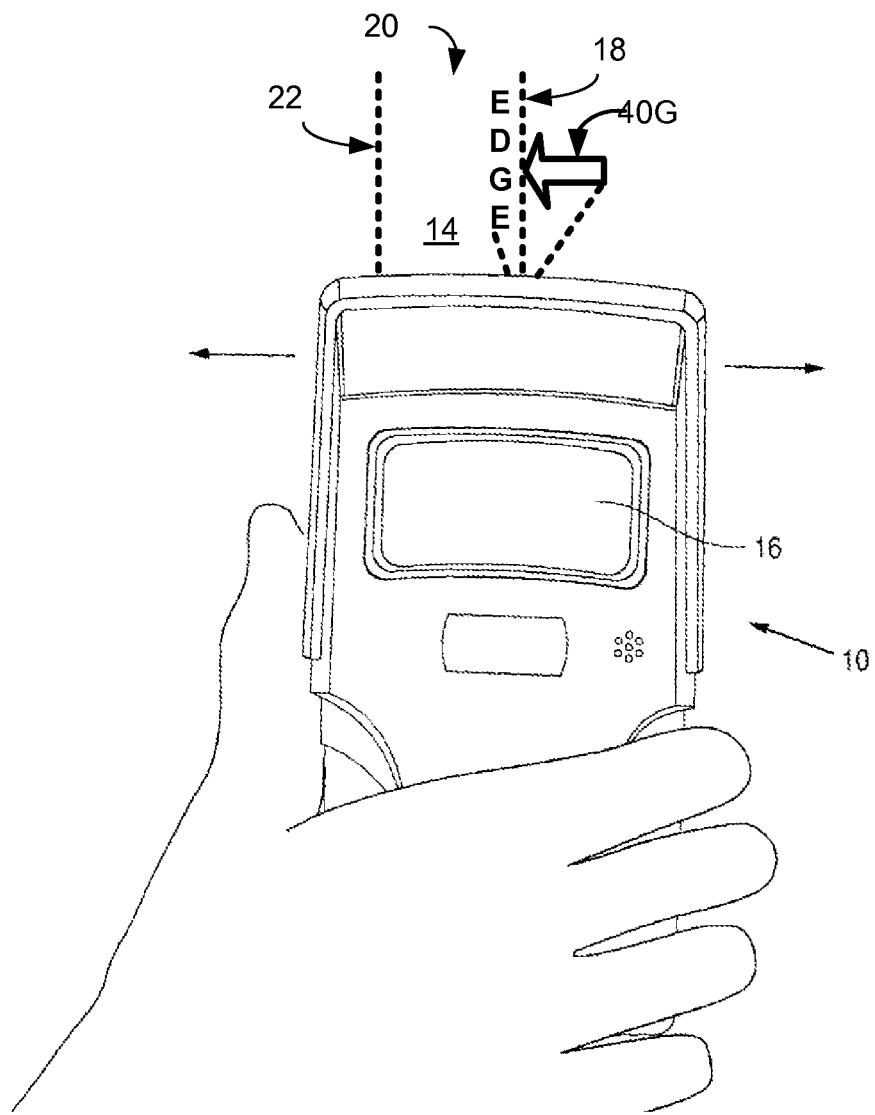

In FIG. 10C, the user has moved the device 10 over an edge 18 of the stud 14. Once the device 10 has detected the edge 18, it projects an icon to the surface 30. For example as shown, the device 10 projects both the letter "EDGE" and an arrow 40G. In some embodiments, the icon is projected at a fixed location relative to the device 10. In other embodiments, the icon may appear stationary relative to the surface 30 but moves relative to the device 10 while the user moves the device 10 to the left and right over the edge.

Figure 10D:
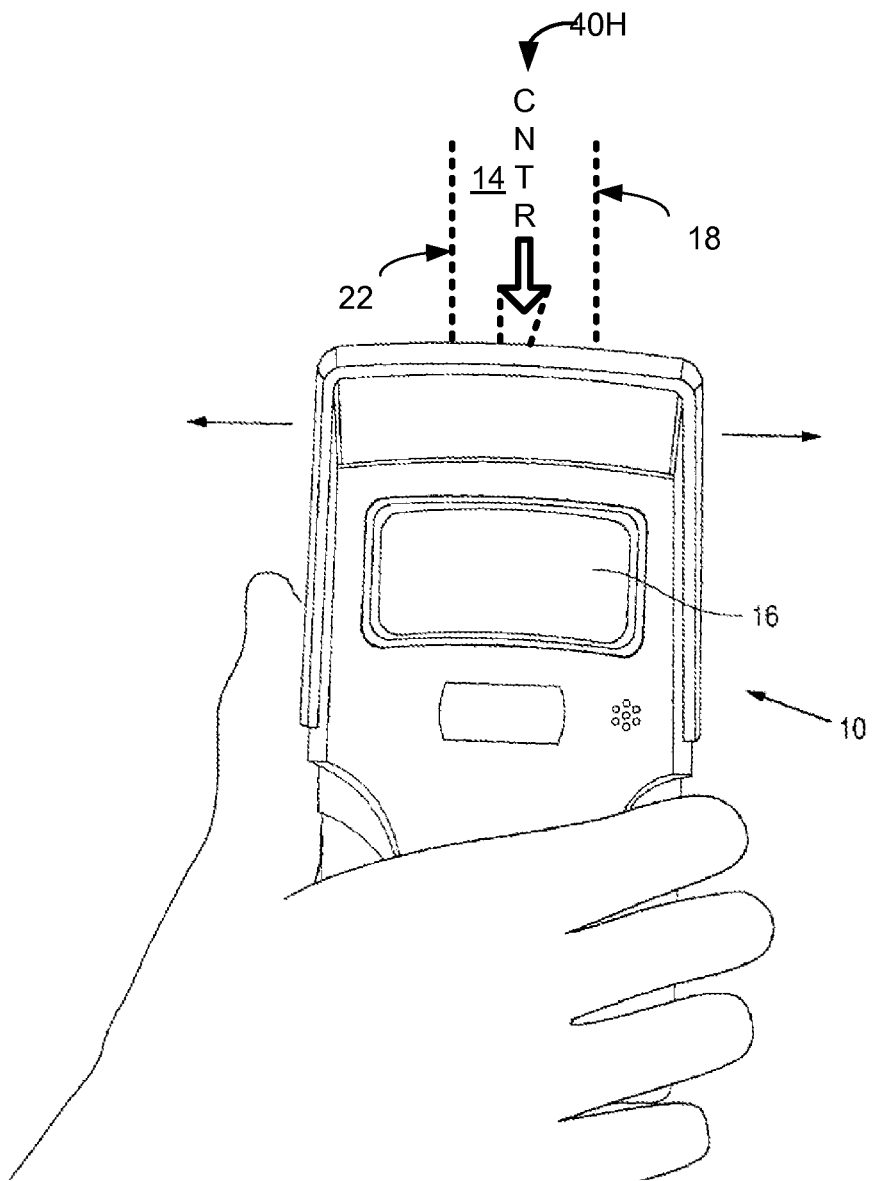

In FIG. 10D, the handheld sensor device 10 is nearly centered over the stud. The device 10 then projects a center icon "CNTR" with an arrow 40H to indicate the device 10 is over a center feature of the stud 14. Again, the device 10 may track the relative position of the feature and adjust its projected icon to appear stationary on the surface as the user moves the device about the centerline of the stud 14.

Figure 11:
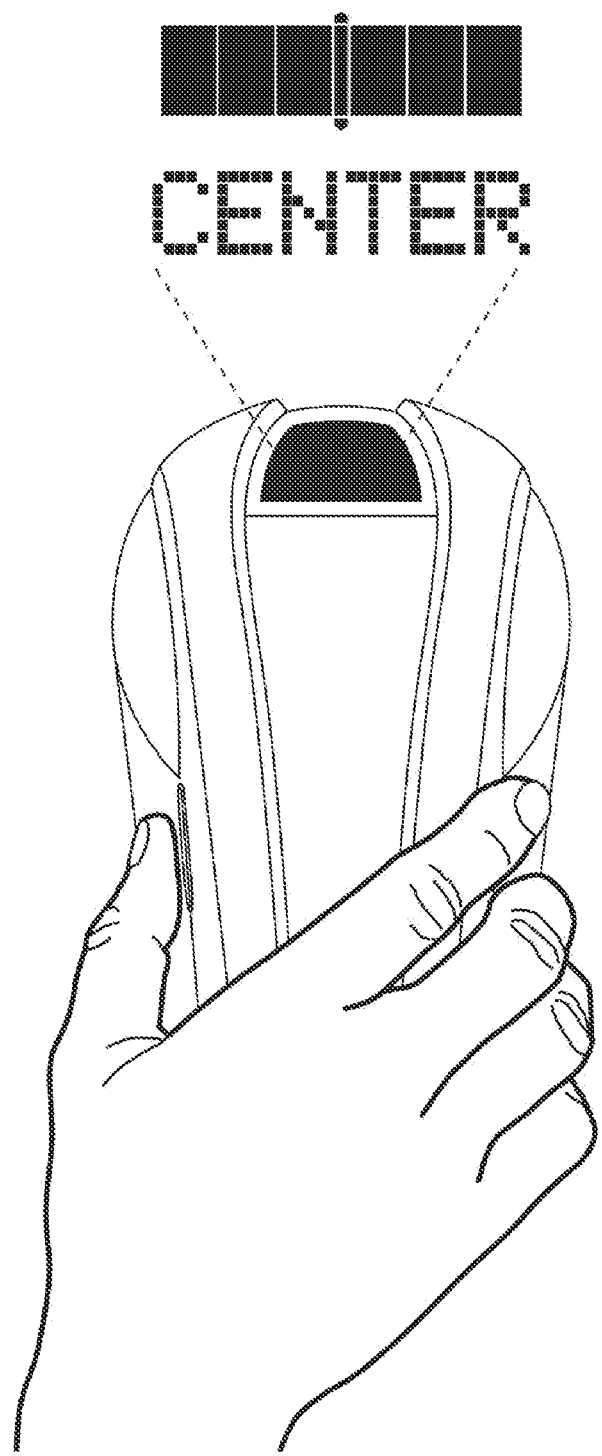

In FIG. 11, the device 10 projects to the surface 30 the word "CENTER" along with a bar. The bar represents the hidden stud 14 and the word "CENTER" represents that the device 10 is centered over the stud 14. Other projections are possible with a handheld sensor device 10 that has a dynamic aperture.

Figure 12A:
FIGS. 12A, 12B, 12C, 12D and 13 show various display information, in accordance with embodiments of the present invention.
Figure 12B:
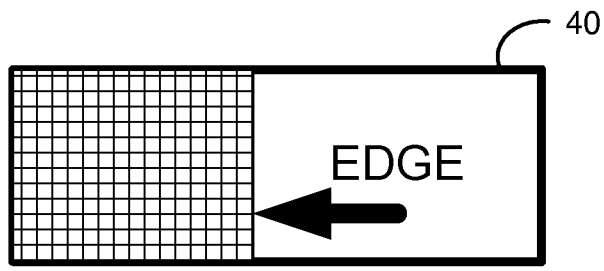
Figure 12C:
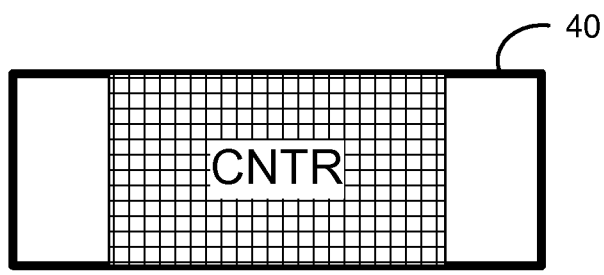
Figure 12D:
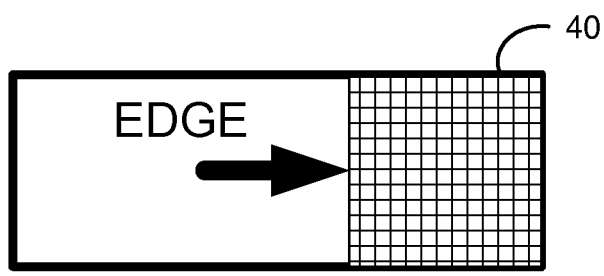

FIGS. 12A, 12B, 12C, 12D and 13 show various display information, in accordance with embodiments of the present invention. FIG. 12A shows a display area 40 that indicates the device 10 is near an edge of the stud 14. In FIG. 12B, the user has moved the device to the left such that it is centered over an edge as indicated by the word "EDGE", by the left-pointing arrow and by the shadowed area to the left side of the display area 40. In FIG. 12C, the user has centered the device 10 directly above the centerline of the stud 14. The projected display area 40 shows a shadowed area representing the hidden stud and also the word "CNTR" or "CENTER" to highlight to the user that the device 10 is centered over the stud 14. FIG. 12D shows the device 10 moved to the left so that it is centered over another edge. The display 40 shows approximately a mirrored images to that shown in FIG. 12B.

The shadowed area may be animated such that is appears relatively stationary against the surface 30 to simulate a view of the stud 14 looking through the surface 30. The pixilated characters making up the words "CENTER", "CNTR" or "EDGE" are examples of dynamic text that the handheld sensor device 10 projects depending on the circumstances and context of use for the device 10 at that instant in time. The content and specifics of the displayed information is determined by a computer, microprocessor or micro controller controlling the device 10. The displayed information also depends on what the device 10 is sensing. Each icon described above (e.g., arrows shown in FIGS. 12B and 12D) convey information (e.g., directional information) with a single icon. Each icon may be static or dynamical and is turned on or off by the device 10.

The projected information depends on what information the handheld sensor device 10 has measured and needs to display to the user. It may include characters, graphics, and icons in various colors to convey user-interface information to the user of the device 10. Some embodiments display the projected information via an LCD aperture or other dynamic aperture within the device 10. The LCD aperture may be a transmissive, negative type, in which the pixels that are transparent will be projected. All other pixels are non-transparent, thus block the light. The displayed icon may be colored by being projected: (1) from a colored LED, (2) through a colored lens (e.g., at or near the aperture), or (3) through a colored LCD. In some embodiments, graphics on the LCD object are pre-distorted (to compensate for tilt and projection angles), and passed through appropriate lenses, so that they appear not to be distorted and correct when projected to the surface. In other words, the image on the LCD object is distorted such that the projection on the surface 30 is not distorted. Control of the information being displayed is managed by the microcontroller or the like, which updates and changes the information dynamically and in real time depending on the current sensor measurements and operating mode.

Figure 13:
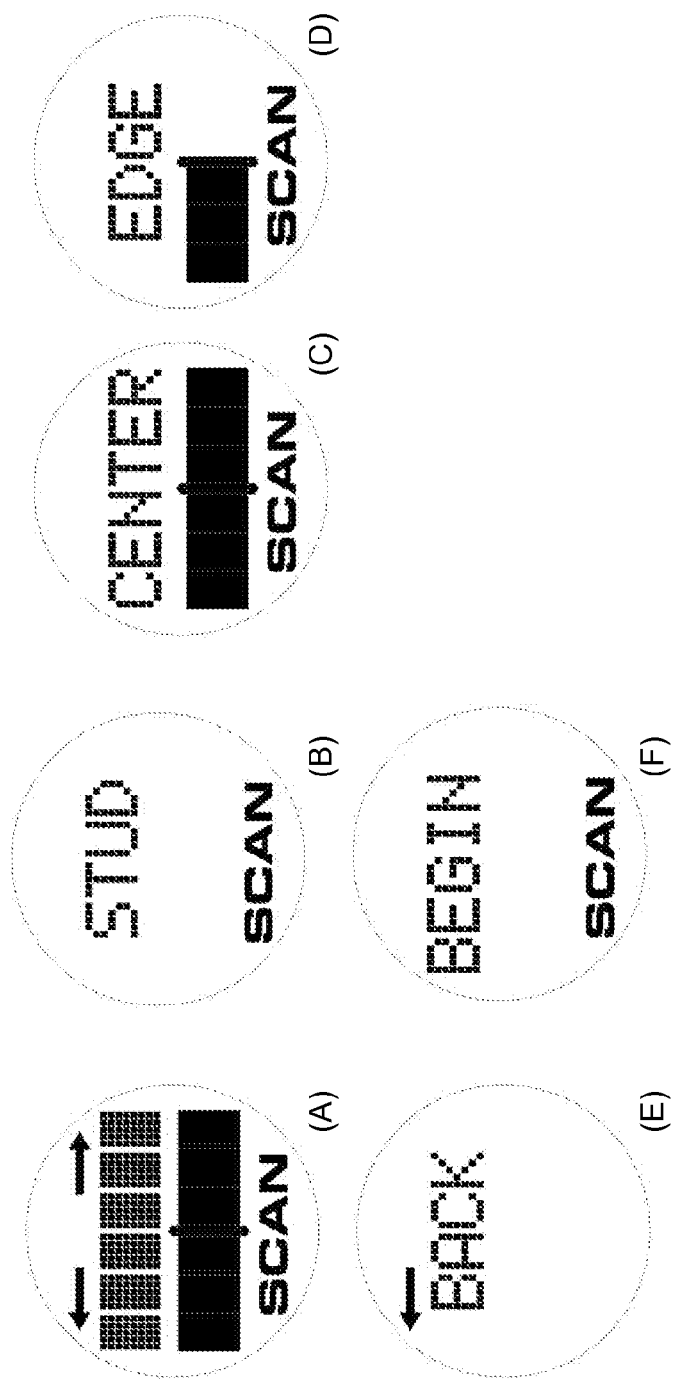
Figure 13:
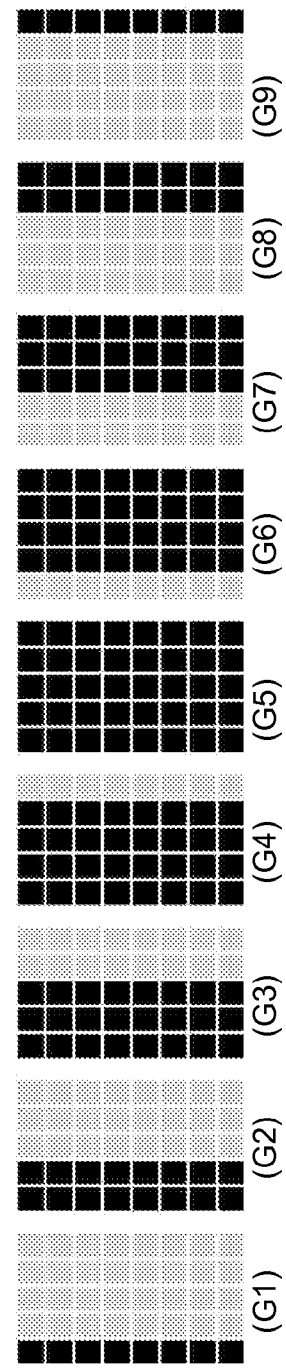

FIG. 13 shows additional possible displayed information. Icon (A) shows a projection of an example initialization information. Icon (B) shows a projection of information telling a user that the device 10 is in a stud scan mode. Icon (C) shows a projection of information telling a user that the device 10 found a center of a stud 14 (similar to FIGS. 10C, 11 and 12C). Icon (D) shows a projection of information telling a user that the device 10 found an edge of a stud 14 (similar to FIG. 10B). Icon (E) shows a projection of information telling a user that the device 10 move back towards a stud 14 (similar to FIG. 10A). Icon (F) shows a projection of instructions to a user to begin scanning. Icons (G1) through (G9) show a progression of projections as a device 10 passes over a stud 14 (shown with black pixels) from right to left.

Figure 14:
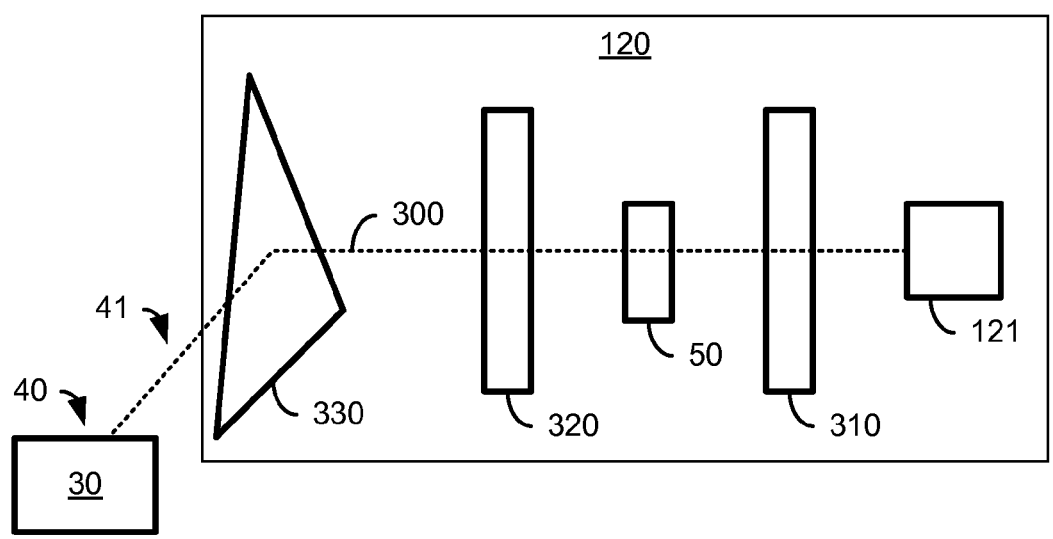
FIG. 14 shows a dynamic light source, in accordance with embodiments of the present invention.

FIG. 14 shows a dynamic light source 120, in accordance with embodiments of the present invention. The light source 120, also referred to as a display projection system, includes a light emitting source 121, such as an LED, which projects light along a projection path 300. A condensing lens 310 focuses this light into a dynamic aperture 50, such an LCD panel. When the dynamic aperture 50 is solid black or opaque, light does not pass through. When projecting and image, the dynamic aperture 50 displays a negative of an image to project. That is, the dynamic aperture 50 is non-transparent for areas not representing the icon to be displayed. Light passing through the dynamic aperture 50 is filtered by this negative image. The light then passes a projection lens 320 and a prism 330. From the prism 330, the projected light 41 provides a visual indication against the surface 30 as icon 40.

Other active projection systems may be used. For example, the LCD panel may contain color LCDs thereby allowing colored icons and text. The LCD panel may allow for partially translucent pixels thus allowing grayscale icons and text.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A handheld sensor device to project a visual indicator against a surface, the device comprising:
   a sensor to sense an object behind the surface and to provide a data signal;
   a controller coupled the sensor to receive the data signal, the controller configured to activate a first icon based on the data signal and to provide a control signal, wherein the first icon comprises a distinct two-dimensional icon; and
   a light source coupled to the controller to receive the control signal and to project the first icon against the surface, the light source comprising
      a light emitting source; and
      an aperture defining the first icon to project light from the light emitting source as the first icon.

2. The device of claim 1, wherein the first icon comprises an arrow.

3. The device of claim 1, wherein the first icon indicates a direction to the object.

4. The device of claim 1, wherein the first icon indicates an edge feature of the object.

5. The device of claim 1, wherein the first icon indicates the object is wooden.

6. The device of claim 1, wherein the first icon indicates the object is metallic.

7. The device of claim 1, wherein the first icon indicates the object is electrically energized.

8. The device of claim 1, wherein the first icon indicates a center feature of the object.

9. The device of claim 8, wherein the light source is further configured to project a second icon against the surface, wherein the second icon indicates an edge feature of the object, and wherein the second icon comprises a distinct two-dimensional icon.

10. The device of claim 1, wherein the aperture comprises a dynamic opening.

11. The device of claim 10, wherein the dynamic opening comprises an LCD panel.

12. The device of claim 1, wherein the aperture comprises a fixed opening.

13. The device of claim 12, wherein the fixed opening comprises an opening formed by joining a top housing and a base housing.

14. The device of claim 1, wherein the light emitting source comprises:
   a first color source comprises a first color for the first icon; and
   a second color source comprises a second color for a second icon, wherein the second icon comprises a distinct two-dimensional icon; and
   wherein the first and second color sources are selectable by the controller.

15. The device of claim 1, wherein the sensor comprises a capacitive sensor.

16. The device of claim 1, wherein the sensor comprises a stud sensor.

17. The device of claim 1, wherein the sensor comprises an electrical field sensor.

18. The device of claim 1, wherein the sensor comprises a magnetic field sensor.

19. A method to project a visual indicator against a surface using a handheld sensor device, the method comprising:
   sensing, by the handheld sensor device, an object behind the surface;
   determining, by the handheld sensor device, a first feature of the sensed object; and
   projecting, from the handheld sensor device, a light emitting source and through an aperture shaped to define a first icon projected onto the surface, the first icon indicating the first feature, wherein the first icon comprises a distinct two-dimensional icon.

20. The method of claim 19, wherein the first icon comprises an arrow.

21. The method of claim 19, wherein the first icon indicates a direction to the object.

22. The method of claim 19, wherein the first icon indicates an edge feature of the object.

23. The method of claim 19, wherein the first icon indicates a center feature of the object.

24. The method of claim 19, further comprising:
determining a second feature of the sensed object; and
projecting a second icon indicating the second feature, wherein the second icon comprises a distinct two-dimensional icon.

25. The method of claim 19, wherein the aperture comprises a dynamic opening.

26. The method of claim 25, wherein the dynamic opening comprises an LCD panel.

27. The method of claim 19, wherein the aperture comprises a fixed opening.

28. The method of claim 27, wherein the fixed opening comprises an opening formed by joining a top housing and a base housing.

29. A method for detecting an object behind a surface using a handheld sensor device, the method comprising:
sensing, by the handheld sensor device, a first feature of the object;
selecting a first icon, from a plurality of icons, based on sensing the first feature, wherein the first icon comprises a distinct two-dimensional icon;
projecting, from the handheld sensor device, the first icon, defined by an aperture, against the surface in response to being selected;
sensing, by the handheld sensor device, a second feature of the object;
selecting a second icon, from the plurality of icons, based on sensing the second feature, wherein the second icon comprises a distinct two-dimensional icon; and
projecting, from the handheld sensor device, the second icon against the surface in response to selecting the second icon.

30. The method of claim 29, wherein:
the first icon indicates a first direction; and
the second icon indicates an opposite direction.

31. The method of claim 29, further comprising:
sensing a third feature of the object;
selecting a third icon, from the plurality of icons, based on sensing the third feature; and
projecting the third icon against the surface in response to selecting the third icon.

32. The method of claim 31, wherein the third icon indicates a center feature of the object.

* * * * *